(12) United States Patent
Laksin et al.

(10) Patent No.: US 6,284,816 B1
(45) Date of Patent: Sep. 4, 2001

(54) ENERGY CURABLE FLEXOGRAPHIC INKS INCORPORATING GRAFTED PIGMENTS

(75) Inventors: Mikhail Laksin, Scotch Plains; Subhankar Chatterjee, Hampton, both of NJ (US); Russell J. Schwartz, Cincinnati; Paul A. Merchak, Loveland, both of OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/197,839

(22) Filed: Nov. 23, 1998

Related U.S. Application Data

(63) Continuation-in-part of application No. 08/878,590, filed on Jun. 19, 1997, now abandoned.

(51) Int. Cl.$^7$ ................. C09D 11/02; C08J 3/28
(52) U.S. Cl. ............ 523/160; 522/143; 522/170; 522/909
(58) Field of Search ................. 523/160, 161; 106/31.13, 31.6, 31.27, 31.28; 522/81, 146, 141, 142, 143, 135, 909, 170

(56) References Cited

U.S. PATENT DOCUMENTS

| | | | |
|---|---|---|---|
| 3,551,311 | 12/1970 | Nass et al. | 204/159.8 |
| 3,661,614 | 5/1972 | Bassemir et al. | 117/38 |
| 4,066,585 * | 1/1978 | Schepp et al. | 524/279 |
| 4,468,255 | 8/1984 | Schwartz et al. | 106/288 Q |
| 4,694,029 | 9/1987 | Land | 522/8 |
| 4,946,508 | 8/1990 | Schwartz et al. | 106/496 |
| 4,946,509 | 8/1990 | Schwartz et al. | 106/496 |
| 4,978,969 | 12/1990 | Chieng | 346/1.1 |
| 5,024,698 | 6/1991 | Schwartz et al. | 106/20 |
| 5,062,894 | 11/1991 | Schwartz et al. | 106/23 |
| 5,085,697 | 2/1992 | Kimura et al. | 106/20 |
| 5,145,997 * | 9/1992 | Schwartz et al. | 564/158 |
| 5,176,745 | 1/1993 | Moore et al. | 106/22 R |
| 5,177,200 | 1/1993 | Kluger et al. | 540/122 |
| 5,275,646 | 1/1994 | Marshall et al. | 106/20 B |
| 5,318,808 | 6/1994 | Crivello, et al. | 427/517 |
| 5,380,769 | 1/1995 | Titterington et al. | 523/161 |
| 5,382,282 * | 1/1995 | Pennaz | 106/31.74 |
| 5,418,016 * | 5/1995 | Cornforth et al. | 427/515 |
| 5,429,841 | 7/1995 | Batlaw et al. | 427/288 |
| 5,514,728 | 5/1996 | Lamanna et al. | 522/31 |
| 5,534,049 * | 7/1996 | Wallstrom et al. | 524/487 |
| 5,535,673 * | 7/1996 | Bocko et al. | 101/211 |
| 5,567,747 * | 10/1996 | Cappuccio et al. | 523/403 |
| 5,585,415 | 12/1996 | Gorzalski et al. | 522/18 |
| 5,629,359 * | 5/1997 | Peeters et al. | 522/96 |
| 5,641,346 | 6/1997 | Mantell et al. | 106/31.58 |
| 5,656,336 | 8/1997 | Kamen et al. | 427/511 |
| 5,658,964 | 8/1997 | Amon et al. | 522/31 |
| 5,766,268 | 6/1998 | Bruhnke | 8/647 |
| 5,830,927 * | 11/1998 | Vanderhoff et al. | 522/81 |
| 5,866,628 * | 2/1999 | Likavec et al. | 522/135 |

FOREIGN PATENT DOCUMENTS

| | | |
|---|---|---|
| 195 0 968 A1 | 7/1996 | (DE) . |
| 0 071 345 B1 | 6/1985 | (EP) . |
| WO 92/13911 | 8/1992 | (WO) . |

OTHER PUBLICATIONS

Noll, Fredrick B., UV Curing Inks for Ink Jet Applications, TOXOT (Science & Applications) pp. 1–7, 1993.

Chandrasekhar, R., Water Based UV Curable Ink Jet Printing Fluid Containing Encapsulated Liquid Crystal, Journal of Radiation Curing, Oct. 1988, pp. 6–11.

Marshall, A.C., Sutty M., Miller, N, and Hudd A.L., The Use of UV Curable Prepolymers in Ink Jet Inks, Radiation Curing: Science & Technology, 1992, pp. 132–46.

Monroe, B.M. and Weed, G.C., Photoinitiators For Free Radical Initiated Photoimaging Systems, Chem. Rev. 1993, pp. 435–48.

* cited by examiner

*Primary Examiner*—Vasu Jagannathan
*Assistant Examiner*—Callie E. Shosho
(74) *Attorney, Agent, or Firm*—Sidney Persley

(57) ABSTRACT

Solvent-free, energy curable flexographic printing inks which contain a pigment; a rheological additive having the structure P-(U-Y)$_s$, wherein P is the residue of an organic pigment or dye, Y is a polyalkylene oxide moiety, U is a linking moiety covalently bonding Y to P and s is an integer from 1 to 3; and an energy curable liquid vehicle which may be a ultraviolet cationic or a free radical initiated polymerization system, cured by actinic radiation; and optionally containing a photoinitiating system.

27 Claims, No Drawings

ENERGY CURABLE FLEXOGRAPHIC INKS INCORPORATING GRAFTED PIGMENTS

RELATION TO OTHER PATENT APPLICATIONS

This application is a continuation-in-part of U.S. patent application Ser. No. 08/878,590 filed Jun. 19, 1997 now abandoned.

BACKGROUND OF THE INVENTION

1. Field of the Invention

This invention relates to low viscosity energy curable flexographic printing inks and methods for using same.

2. Description of Related Art

Low viscosity and good flow are the most important factors affecting liquid ink behavior and improved printability. These factors are particularly important for formulating inks for flexographic printing.

Schwartz et al. in U.S. Pat. No. 4,468,255, disclose rheology modifiers for arylide yellow pigment dispersions. The rheology modifiers which are derived from diarylide pigments improve the fluidity of non-aqueous arylide pigment dispersions prepared from either monoarylide or diarylide yellow pigments. Schwartz et al. inla series of patents (i.e., U.S. Pat. Nos. 4,946,508; 4,946,509; 5,024698; and 5,062,894) have disclosed modified azo pigments for use in conventional, solvent and water based inks and coatings to function as rheology control agents. In each of these patents, Schwartz et al. modify an azo pigment (e.g., a diarylide pigment, a monoazo pigment, a disazo pyrazolone pigment and the like) by grafting a polyalkylene oxide to the pigment so that water based inks made from these pigment compositions exhibit high coloring strength, cleaner shades, lower rheology, and enhanced gloss compared with conventional water based inks.

To increase printing throughput, ultraviolet (UV) or electron beam (EB) curable inks have been developed that allow printers to reduce the solvent content of the ink. It is always a challenging task for a UV or EE curable liquid ink formulator to develop ink formulations with a viscosity low enough for improved flow, while at the same time maintaining other essential characteristics, such as to cure, adhesion, low odor, etc. Traditional organic and inorganic pigments used in formulating energy curable liquid inks, are poorly dispersed in the vehicles used in the systems. As a result, poor pigment wetting leads to a thixotropic structure. If the inks are not subjected to high shear, the apparent viscosity will remain high and the ink will exhibit poor transfer resulting in poor printability. Flow additives have been tried, however, with limited success for different pigments. The situation becomes more critical in the case of cationic curable inks, where not all the pigments and additives can be used due to the presence of basic functionalities. In addition, some energy curable inks of the prior art contain fugitive solvent (such as water, alcohols and the like) as part of the vehicle to reduce viscosity, aid in pigment dispersion, and modify flow during printing. However, after printing but before curing, the fugitive solvent is typically removed to prevent interference with the curing process and to prevent it from having an adverse affect on the printed image. The curing delay required by solvent removal, as well as attendant unpleasant odors, are further undesirable limitations to printing. Furthermore, solvent removal is desirable for environmental reasons.

A UV cured cationically polymerized printing ink is disclosed by Seng in Patent Application DE 195 00 968.1 for use in indirect letterpress printing or dry offset printing. Seng lists the differences between letterpress and flexographic printing and the list includes critical differences in ink viscosities. In particular, Seng discloses that printing inks used in flexographic printing have viscosities in the range of 0.01 cps to 2 cps at 20° C. and in the range of 3 cps to 100 cps, and more preferably in the range of 4 cps to 10 cps. Seng's inks are cationically polymerized and differ from the very high viscosity printing inks used in indirect letterpress printing in solvent content. While inks of this viscosity range are useful in high shear, indirect letterpress printing, such inks have high tack which causes them to be unsuitable for low shear applications such as flexography, which requires low tack inks.

Although improvements have been made in energy curable cationic ink formulations, there continues to be a need for energy curable ink formulations (including free radical initiated curable formulations) which have a high color strength, cleaner shade and enhanced gloss but retain a suitably low viscosity as required for flexographic printing.

SUMMARY OF THE INVENTION

In one aspect, the invention is an energy curable flexographic ink comprising a pigment, a rheological additive having the structure:

$$P\text{-}(U\text{-}Y)_s$$

wherein P is the residue of an organic colorant, Y is a polyalkylene oxide moiety, U is a linking moiety covalently bonding Y to P and s is an integer from 1 to 3; and an energy curable liquid vehicle; wherein the ink is substantially free of fugitive solvent and has a viscosity ranging from about 50 cps to about 3,000 cps,and more preferably from about 50 cps to about 1,500 cps.

In another embodiment of this invention, this energy curable flexographic ink further comprises a polymerization initiating system activatable by actinic radiation.

In yet another embodiment of this invention, there is a method of flexographic printing and curing a flexographic ink comprising the steps of: preparing the energy curable flexographic ink described supra; printing the ink onto a substrate surface to form the ink image; and subjecting the ink image to actinic radiation or thermal energy to form a cured ink image.

DETAILED DESCRIPTION OF THE INVENTION

The present invention is directed to a novel solvent-free, energy curable flexographic ink having a low viscosity and its application. The term "energy curable or cured" as used herein, in reference to ink means an ink which can be cured, hardened, polymerized, or crosslinked by the action of actinic radiation such as UV or EB radiation and the like, from a radiant energy source or from a thermal energy source by heating with a conductive or radiant heat source such as a platen, an oven, infrared (IR), microwave, and the like.

The energy curable ink of this invention comprises a pigment, a rheological additive and an energy curable liquid vehicle is substantially free of fugitive solvent. The terms "substantially free of fugitive solvent" and "solvent-free", as used herein in reference to inks, means free of a liquid component (e.g., water, lower alcohols, alkanes, aromatics, aliphatics, ketones, acetates and the like) which, after printing, is evaporated, imbibed into a substrate surface, or both, and does not remain as an essential component of the cured ink. Further, these terms are not intended to exclude trace or residual solvents resulting from the manufacture of ink components prior to ink formulation.

The term "colorant", as used herein means an organic pigment or dyestuff. The energy curable liquid vehicle typically comprises one or more low molecular weight mono- or multi-functional monomers. For offset inks and other inks which require higher viscosities, a resin, a reactive oligomer or polymer may also be present. The ink of the present invention may be cured thermally or by actinic radiation sources, such as electron beams and the like; or photolytically cured by actinic radiation, such as UV radiation and the like, when a suitable initiating system is incorporated into the ink. The solvent-free, energy curable ink of this invention is more fully described below and in the following Examples.

Pigment

The pigment is any organic pigment that can be employed for the coloration of conventional printing inks of the prior art. The pigment may also be carbon black. Pigments suitable for use in the present invention may be any conventional organic pigment such as: Pigment Yellow 1, Pigment Yellow 3, Pigment Yellow 12, Pigment Yellow 13, Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment 26Yellow 126, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23, or carbon black, including Pigment Black 7 and the like.

Rheological Additive

The rheological additive is a polyalkylene oxide covalently bonded (i.e. grafted) to the residue of an organic colorant and has the structure P-(U-Y)$_s$, in which P is the residue of an organic colorant, Y is a polyalkylene oxide moiety containing about 4 to about 400 alkylene oxide repeat units, and U is a linking moiety covalently bonding Y to P and s is an integer from 1 to 3.

Typically, P is a residue of a pigment, such as, a residue of an azo pigment, phthalocyanine pigment, dioxazine pigment, quinacridone pigment, perylene pigment, perinone pigment or the like. Preferably, P is the residue of a diarylide pigment, monoazo pigment, disazo pyrazolone pigment, phthalocyanine pigment, or perylene pigment.

The polyalkylene oxide moiety, Y, may be the residue of any polyalkylene oxide such as an ethylene oxide polymer, an ethylene oxide/propylene oxide copolymer and the like. Preferably, Y is an alkylene oxide copolymer having the general formula:

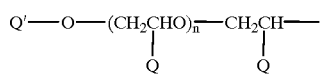

wherein n is about 4 to about 400 and more preferably is about 4 to about 60; Q is H, CH$_3$ or a combination thereof;

and Q' is a C$_1$–C$_6$ alkyl moiety. The weight average molecular weight of the polyalkylene oxide moiety typically is between about 300 and 3,600; and preferably between about 1,000 and 3,000. The polyalkylene oxide moiety, Y, may be grafted to the residue of an organic colorant, P, through a linking moiety, U, which is preferably a covalent bond or multivalent moiety such as C$_1$–C$_6$ alkyl, —NHSO$_2$—, —O—, —CO—, —COO—, —N—, —CONH—, and the like. It is understood that the particular linking moiety employed will be determined by those skilled in the art depending on the nature of P.

Combinations of pigment and rheological additive particularly useful in preparing the solvent free energy curable ink of the invention are described in U.S. Pat. Nos. 4,946,508; 4,946,509; 5,024, 698; and 5,062,894; each of which is incorporated herein by reference.

In particular, Schwartz et al, U.S. Pat. No. 4,946,508 discloses disazo pyrazolone compositions which contain said rheological additives and their method of manufacture. Such disazo pyrazolone pigment compositions have the general formula:

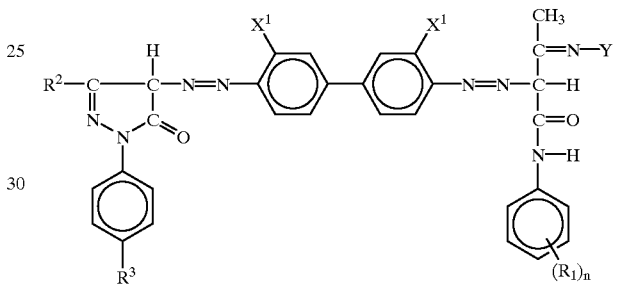

wherein Y is the polyalkylene oxide moiety; R$^1$ is H, CH$_3$, OCH$_3$, OCH$_2$CH$_3$ or Cl; n is selected from an integer from 1 to 5; R$^2$ is CH$_3$ or COOCH$_2$CH$_3$; R$^3$ is H or CH$_3$; and X$^1$ is Cl or OCH$_3$.

U.S. Pat. Nos. 4,946,509, Schwartz et al discloses azomethine compositions and their method of manufacture. Such azomethine pigment compositions have the general formula:

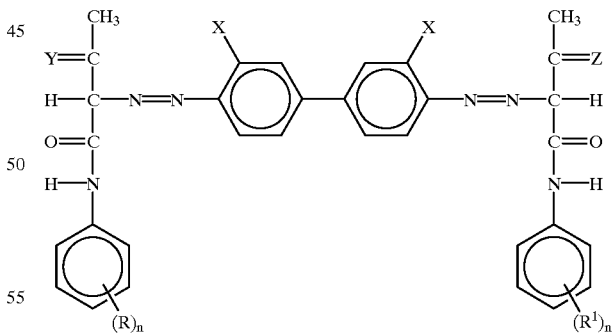

wherein Y is the polyalkylene oxide moiety containing about 4 to about 200 groups; R and R$^1$ are independently selected from the group consisting of H, CH, OCH$_3$, OCH$_2$CH$_3$ and Cl; n is selected from an integer from 1 to 5; X is selected from the group consisting of Cl, CH3, and OCH3; and Z is selected from 0 and N—Y.

U.S. Pat. No. 5,024,698, Schwartz et al discloses monoazomethine compositions and their method of manufacture. Such monoazomethine pigments have the general formula:

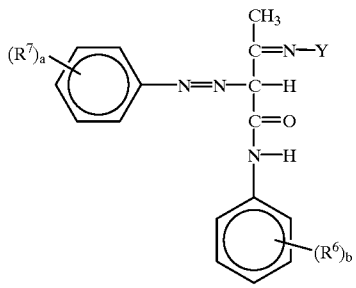

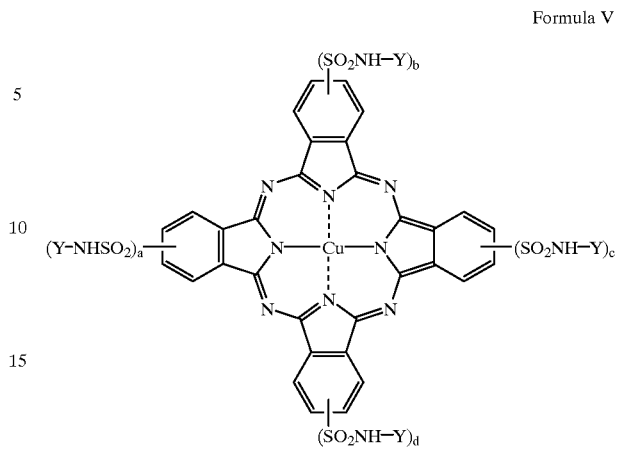

Formula V wherein Y is the polyalkylene oxide moiety; $R^6$ is independently selected from the group consisting of Cl, $OCH_3$, $CH_3$, $OC_2H_5$, $C_2H_5$, and $CONH_2$; $R^7$ is independently selected from the group consisting of Cl, $OCH_3$, $CH_3$, $NO_2$, $OC_2H_5$, $C_2H_5$, $CONH_2$, $SO_3H$, OH and COOH; and a and b are independently selected from integers 0 to 5.

U.S. Pat. No. 5,062,894, Schwartz et al discloses diarylide compositions and their method of manufacture. Such diarylide pigment compositions have the general formula:

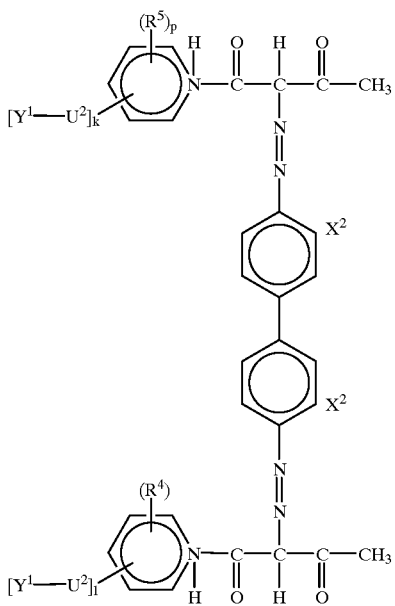

wherein $R^4$ and $R^5$ are independent selected from the group consisting of $C_1$–$C_4$ alkyl, $C_1$–$C_4$ alkoxy, and halogen; m and p are independent selected from integers of 0 to 5; $X^2$ is selected from the group consisting of Cl, $CH_3$, and $OCH_3$; $U^2$ comprises a divalent bridging moiety selected from the group consisting of $C_1$–$C_6$ alkyl, —$NHSO_2$—, —O—, —CO—, —COO—, and —COH—; $Y^1$ comprises the polyalkylene oxide moiety having a number average molecular weight of about 200 to 10,000; and k and l are independently selected from integers 0 or 1, with the proviso that for at least 50 wt. % of the composition, k and l are both 0, and for at least 3 wt. % of the composition k and/or l are 1.

Other rheological additives particularly useful in the energy curable inks of this invention, include phthalocyanine compositions having the P-U-Y structure in which P, is the residue of a copper phthalocyanine pigment and wherein the linking moiety, U, is —$NHSO_2$— which joins P to Y. Such copper phthalocyanine based rheological additives have the formula:

wherein Y is a polyalkylene oxide moiety which has the general formula:

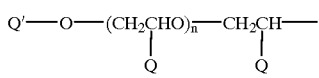

wherein n is about 4 to about 400, and a, b, c and d are integers independently from 0 to 4, provided at least one of them is 1; Q is selected from H, $CH_3$ or a combination thereof; and Q' is a $C_1$–$C_6$ alkyl moiety.

The rheological additive used in this invention may be prepared by any conventional method. Illustrative methods for preparing the pigments with the rheological additives described herein are disclosed in U.S. Pat. Nos. 4,946,508; 4,946,509; 5,024,698; and 5,062,894 and in the examples.

The pigment compositions used in this invention typically contain a minor portion of said rheological additive and a major portion of the conventional pigment. The residue of the organic colorant that is contained in the rheological additive does not need to be of the same type as the pigment of the ink formulation. For example, the additive of Formula V may be utilized with Pigment Violet 23 or Pigment Black 7.

An advantage of the preparation methods disclosed in the Schwartz et al. patents supra, is that a blend of the colorant additive and the pigment is produced directly, and may be used without further blending. To produce printings inks with a desired hue, a separate pigment may be added which is distinct from the pigment and rheological additive. Methods of effecting a desired hue from precursor pigments are well known to the ink formulator and are illustrated in the examples.

Energy Curable Liquid Vehicle

The solvent-free, energy curable ink of this invention contains as the third essential component a quantity of an energy curable liquid vehicle which is substantially free of fugitive solvent. The quantity of liquid vehicle employed is an amount sufficient to make up 100% of the ink weight when taken together with other ink components. The radiation curable liquid vehicle typically comprises one or more low molecular weight mono-functional or multi-functional monomers. For offset inks and other inks which require higher viscosities, a resin, a reactive oligomer or polymer may also be present. These components may react with the monomers upon curing. The energy curable liquid vehicle is characterized in that it is curable to a solid by exposure to energy from a radiant or thermal energy source as described supra. The liquid vehicle may be cured to a solid by exposure to energy, such as exposure to high energy electrons from an electron beam source. Alternatively, curing of the liquid vehicle may be initiated by energy activation of a polymerization initiating system (e.g., by UV radiation) as will be described in detail hereinbelow. In this context, a polymerization initiating system may be considered an optional component of the energy curable liquid vehicle. The liquid vehicle may be a ring opening polymerizable composition, a free radical addition polymerizable composition, or by a combination of ring opening and free radical polymerization. In either composition, the liquid vehicle is cured or hardened by polymerizing and/or crosslinking, at least the reactive monomers of the liquid vehicle. In order to reduce environmental contamination and maintain formulation integrity, the liquid vehicle is typically formulated with components having low volatility under ambient printing conditions.

When the liquid vehicle is a ring opening polymerizable composition, upon energy initiation it forms a polymer typically bound by ester, or ether linkages.

In a preferred embodiment of the invention the polymerizable composition is a cationic polymerizable system comprising one or more mono-functional or multi functional epoxides. The liquid vehicles typically contain at least one cycloaliphatic epoxide. Examples of such cycloaliphatic epoxides are adducts of epoxides and hydroxyl components such as glycols, polyols, or vinyl ether, such as 3,4-epoxycyclohexylmethyl 3,4-epoxy-cyclohexane carboxylate; bis (3,4-epoxy-cyclohexyl-methyl)adipate; limonene monoepoxide; limonene diepoxide; diglycidyl ester of hexahydrophthalic acid; 1-vinyl-3,4-epoxycyclohexane; epoxidated dicyclopentyl alcohol; or a mixture thereof. Preferred cycloaliphatic epoxides of this type are 3,4-epoxycyclohexylmethyl 3,4-epoxy-cyclo-hexylcarboxylate and 1,3-bis(2-(7-oxabicyclo(4.1.0)hept-3-yl)ethyl)-1,1,3,3-tetramethyldisiloxane. In addition to the cycloaliphatic epoxides there may be one or more noncycloaliphatic epoxides, such as di- or tri-glycidyl ether, alkoxylated bisphenol A, 1,6-hexane diol, glycerol; neopentylglycol; or trimethylolpropane. The epoxy diluent likewise may be diglycidyl ether of bisphenol A; an alpha-olefin epoxide, a Novalac epoxide, epoxidated linseed oil, soy oil; epoxidated polybuta-diene; 1,2-epoxydecane; caprolactone triol; glycidyl ether; alkyl glycidylether; epoxidated silanes; glycidoxymethoxysilane; glycidoxyethoxysilane and 2-ethylhexylglycidyl ether. In such epoxy compositions, the ink typically contains a cationic initiating system activatable by actinic radiation as will be described hereinbelow. A preferred epoxy diluent is 2-ethylhexyl-glycidyl ether. In such epoxy compositions, the ink typically contains a cationic initiating system activatable by actinic radiation as will be described hereinbelow.

When the energy curable liquid vehicle is a free radical addition polymerizable composition, the vehicle comprises a liquid compound having terminal ethylenic unsaturation.

Typically, the liquid vehicle is a free radical addition polymerizable system comprising an ethylenically unsaturated mono- or multi-functional monomer. The monomer is a lower molecular weight ethylenically unsaturated compound which forms a polymer directly upon initiation by free radicals generated by absorbed energy. In some formulations an oligomeric or polymeric component which can be further polymerized may also be present. In such cases the further polymerizable material will be soluble in, or dispersible in the monomer vehicle.

Typically, the monomeric compounds have one, two, or more terminal ethylenically unsaturated groups. Representative of such monomeric compounds are: N-vinyl pyrrolidinone; dipropylene glycol diacrylate; tripropylene glycol diacrylate; butanediol diacrylate; hexanediol diacrylate; trimethylol propane triacrylate; ethoxylated trimethylol propane triacrylate; glycerol-propoxy triacrylate; pentaerythritol triacrylate; dipropylene glycol dimethacrylate; tripropylene glycol dimethacrylate; butanediol dimethacrylate; hexanediol dimethacrylate; trimethylol propane trimethacrylate; di-(3-methacryloxy-2-hydroxypropyl ether) of bisphenol-A; di(2methacryloxyethyl ether) of bisphenol-A; di-(3-acryloxy-2-hydroxypropyl ether) of bisphenol-A; di(2-acryloxyethyl ether) of bisphenol-A; and the like.

To achieve the desired ink viscosity and crosslinking properties, typically the monomer composition contains a combination of multifunctional acrylic monomers along with a monomer containing a single terminal ethylenic group, as illustrated in the examples which follow.

When the inks of this invention contain an oligomeric or polymeric material, said materials typically possess ethylenic unsaturation which can react with the ethyl-enically unsaturated monomers. Representative of such oligomers are acrylated epoxy resins; acrylated polyurethanes; acrylated polyesters; and the like.

The inks of the present invention may also contain a preformed polymer such as an acrylic polymer or copolymer of $C_1$–$C_4$ alkyl acrylates or methacrylates, or acrylic or methacrylic acid, vinyl polymers and copolymers such as polyvinyl chloride, polyvinyl acetate, polyvinyl alcohol, polyvinylpyrolidone, cellulosic polymers and copolymers; and the like.

Polymerization Initiating System

Unless the ink is formulated specifically for use with EB curing, it will contain a polymerization initiating system activatable by actinic radiation, such as UV and thermal radiation. Such a photoinitiator system has one or more compounds that directly furnish cations or free radicals when activated by actinic radiation. In the case of UV activation, the photo-initiator system may also contain a sensitizer that extends the spectral response into the ultraviolet, visible and near infrared spectral regions. Cationic polymerization initiating systems typically are used to initiate ring opening polymerization in systems such as the epoxy compositions described herein. Such cationic initiating systems include all substances which liberate Lewis acids or Broensted acids upon exposure to actinic radiation. Cationic photoinitiating systems which are particularly useful in the energy curable inks of this invention are arylsulfonium salts, especially the triarylsulfonium salt such as triarylsulfonium phosphate, triarylsulfonium antimonate, triphenylsulfonium hexafluorophosphate, and diarylsulfonium salt; and aryliodonium salts, such as diaryliodonium hexafluoroantimonate, bisdodecyldiphenyliodonium hexafluoroantiminoate, and the like. Such cationic photoinitiators may be used individually or in combination to effect suitable curing of the ink. Preferred are diaryliodonium hexafluoroantimonate and($n^5$-2,4-cyclopentadien1-yl)[(1,2,3,4,5,6-n) (1-methylethyl) benzene]-iron$_+$-hexafluorophosphate (-l).

In free radical initiated curing systems such as the UV curable inks disclosed herein, typically irradiation of a photoinitiator produces free radicals that initiate polymerization. A wide variety of photoinitiators may be used in the energy curable inks of this invention. A few are described, for example, by B. M. Monroe and G. C. Weed in *Photoinitiators for Free Radical Initiated Photo-Imaging Systems*, Chem. Rev. 93, pp. 435–48 (1993), incorporated herein by reference, describes thioxanthone, ethyl 4-(dimethylamino)

benzoate, alpha amino acetophenone, and Michler's ketone as photoinitiators.

Adjuvants

The radiation curable inks of this invention may optionally contain the usual adjuvants to adjust ink flow, surface tension, surface penetration and gloss of the cured printed ink. Such adjuvants contained in the ink typically are a surface active agent, a wax, a humectant or a combination thereof. These adjuvants may function as leveling agents, wetting agents, dispersants, defrothers or deareators, or additional adjuvants may be added to provide a specific function. Preferred are isopropyl adjuvants include fluorocarbon surfactants such as FC430, available from 3M Company, St. Paul, Minn.; silicones such as DC57, available from the Dow Chemical Corporation, Midland, Mich.; polyethylene wax; polyamide wax; polytetrafluoroethylene wax; and the like.

Printing Ink Formulation

The solvent-free, energy curable ink contains as its essential ingredients typically about 2 to about 15% by weight of pigment, about 0.1 to about 10% by weight of the rheological additive and the balance being the liquid energy curable vehicle which is substantially free of a fugitive solvent. The energy curable liquid vehicle typically comprises, one or more low molecular weight mono-functional or multi-functional monomers. For offset inks and other inks which require higher viscosities (>1,000 cps), a resin, a reactive oligomer or polymer may also be present. In addition to the essential ingredients the energy curable ink may also contain up to about 6% by weight of the polymerization initiating system activatable by actinic radiation; and up to about 10% or less by weight of a surface active agent, a wax, humectant or combination thereof.

The primary advantage offered by the solvent-free, energy curable ink of this invention is that the rheology may be readily adjusted to provide an ink viscosity anywhere between about 50 cps and about 3,000 cps at 240 s$^{-1}$ and 25° C., simply by adjusting the ratio of the various types of monomer component, and/or by adjusting the ratio of pigment and rheological additive to liquid vehicle, and/or by adjusting both ratios.

The ink may be prepared by any conventional mixing and milling method typically used for preparing printing inks. Typically, the pigment and rheological additive are mixed with the liquid vehicle then milled. After milling additional liquid vehicle and any desirable adjuvants are optionally added and mixed to produce the energy curable ink. As indicated the above mentioned ratios are adjusted to achieve a printing ink with the desired viscosity, flow, color density, and curing characteristics. The ink formulation process is more fully described in the examples.

Method of Printing and Curing This invention is also directed to a method of printing or ink jet printing and curing an ink image comprising the steps of: (a) preparing a solvent-free energy curable flexographic ink as described supra; (b) printing the ink on a substrate surface to form an image; and (c) subjecting the image to actinic radiation or thermal energy to form a cured ink image.

The method of this invention is particularly directed to printing operations requiring low viscosity inks as in flexographic printing. It is understood, however, that any suitable printing and curing means may be used to print and cure the solvent-free energy curable ink of this invention. Such suitable means include but are not limited to conventional gravure printing, equipped with thermal UV and/or EB curing stations which follow the printing station. Thus, when the energy curable ink is free of a photoinitiator it may be cured by actinic radiation which is a beam of electrons. Alternatively, when the energy curable ink contains a polymerization initiating system, it may be cured by actinic radiation which is UV radiation. The printed energy curable ink containing a polymerization initiating system may be initially subjected to UV radiation and subsequently to a beam of electrons or thermal energy to complete the cure. As used herein, thermal energy is intended to include radiant energy such infrared or microwave energy and the like; or conductive thermal energy such as that produced by a heated platen or hot air oven, for example.

The following examples illustrate specific aspects of the present invention and are not to limit the scope thereof in any respect and should not be so construed. In the following examples all percentages provided are in volume percent unless otherwise noted.

EXAMPLE 1

An energy curable, cationic ink formulation was formulated using a modified Pigment Yellow 12 composition containing Pigment Yellow 12 and rheological additive. The modified Pigment Yellow 12 composition containing Pigment Yellow 12 and rheological additive was prepared as described in Example III of U.S. Pat. No. 5,062,894. A mixture of 16.5 parts of isatoic anhydride (96% pure) and 220 parts of a primary amine-terminated poly (ethylene oxide/propylene oxide) (70/30) copolymer having a number average molecular weight of approximately 2,000 (available from Huntsman Corporation) was stirred and heated gradually to 80° C. until evolution of $CO_2$ ceased. The infrared spectrum indicated that the isatoic anhydride had completely reacted as evidenced by the disappearance of the characteristic anhydride absorptions at 1748 cm$^{-1}$. Thereafter, 16.5 parts of t-butyl acetoacetate were added and the reaction mixture was heated at 95° C. and stirred for 8 hours to form Agent 1.

Tetrazotized 3,3' O-dichlorobenzidine (DCB) was then prepared by adding 21.7 parts DCB to 39.8 parts of 200 Be hydrochloric acid and 140 parts of ice/water mixture with constant stirring to form a homogenous suspension. 32.6 parts of a 38% solution of sodium nitrite was added to the suspension and stirring was continued for 1 hour 0–3° C. The excess nitrous acid was then destroyed by the addition of approximately 0.5 part sulfamic acid.

A fine suspension of coupler was prepared by charging 31.1 parts acetoacetanilide and 0.5 part phenylmethyl pyrazolone (a shading agent) to 400 parts water and 33.6 parts of 50% sodium hydroxide. The mixture was stirred until all solids were dissolved, then the temperature was adjusted between 0 and 5° C. and thereafter the coupler was precipitated by slowly adding 36.2 parts of 70% acetic acid. Immediately prior to coupling, 20.6 parts of Agent 1 were added to the coupler suspension as stirring was maintained throughout coupler preparation and reaction.

Coupling was then carried out by adding the solution of tetrazotized DCB to the fine suspension of coupler over a 40 minute period while stirring until no excess tetrazotized DCB remained. Then the temperature was increased to 40° C. The resulting pigment slurry was stirred an additional 30 minutes, filtered, washed and dried in an oven at 75° C. (Yield 69 parts of Modified Pigment Yellow 12 composition containing Pigment Yellow 12 and rheological additive).

An energy curable, cationic ink was formulated from the following components:

| COMPONENTS | WEIGHT % |
|---|---|
| Cyracure ® 6110[a] | 65.5 |
| Modified Pigment Yellow 12 | 15 |
| CD 1012[b] | 3 |
| Heloxy ® 116[c] | 15 |
| PE wax[d] | 1 |
| DC 57[e] | 5 |

[a]Cyracure ® 6110, available from the Union Carbide Corporation, Boundbrook, NJ, is 3,4-epoxycyclohexylmethyl-3,4 epoxycyclohexylcarboxylate;
[b]CD 1012, available from the Sartomer Corporation, Exton, PA, is diaryliodonium of hexafluoroantimonate;
[c]Heloxyo 1-16, available from the Shell Chemical Company, Houston, TX, is 2-ethylhexylglycidyl ether;
[d]PE wax, available from the Shamrock Corporation, Newark, NJ, is polyethylene wax; and
[e]DC57, available from the Dow Chemical Corporation, Midland, MI, is silicone additive.

The Cyracure® 6110 and the Modified Pigment Yellow 12 were mixed at high speed (about 1000 rpm) with a Cowles blade then processed through a media mill containing 1 mm size media. After processing the remaining components were added and the viscosity of the two inks were measured.

| PIGMENT | VISCOSITY @ 25° C. |
|---|---|
| Modified PY-12 | 300 ± 50 cps at 240 s$^{-1}$ |
| Conventional PY-12 | 1500 ± 200 cps @ 240 s$^{-1}$ |

Printing runs were carried out with the modified ink on a flexographic (F-1) printability tester (available from IGT Reprotest, Amsterdam, The Netherlands). The tester was equipped with a UV radiation unit and a lamp having an output of 200 Watt/inch in the UV spectral region and a cylindrical reflector. The major elements of the tester are: a plate cylinder with a replaceable photopolymer flexographic plate; an anilox roller for applying ink to the plate cylinder; a doctor blade assembly for regulating the ink supplied to the anilox roller; a rubber printing cylinder which along with the plate cylinder, forms a nip through which a substrate carrier passes. The flexographic plate was an Epec® photopolymer plate (available from PolyFiberon Corporation, Atlanta. Ga.). The substrate which was printed was polyester label film (available from Fasson, Painsville, OH) having a gloss of 67. When printing this film, the anilox roller was steel and had 80 line/cm and a cell volume 17.5 M$^1$/M$^2$. The inking pressure between the anilox and the plate was adjusted to be 250 N and the printing pressure between the plate and the printing cylinder was 250 N. The printing speed was 1 m/sec.

The following parameters were measured to assess the quality of the printed image: optical density was measured with an XRite® 418 densitometer (available from Xrite Corporation, Dallas, Tex.); and gloss was measured with a BYK portable glossmeter (available from BYK Chemie, Wallingford, Conn.) at a 60° angle using the statistical mode. Using modified Pigment Yellow 12 ink composition, the ink was applied to the substrate and cured with this apparatus. A cured ink film was likewise printed using conventional Pigment Yellow 12 ink composition.

Color density and Gloss measurements were also carried out with the modified Pigment Yellow 12 and conventional Pigment Yellow 12 prints. The assessed quality using the two ink formulations were:

| PIGMENT | COLOR DENSITY | GLOSS 60° |
|---|---|---|
| Modified PY-12 | 1.44 | 87 |
| Conventional PY-12 | 1.00 | 59 |

The ink containing the modified Pigment Yellow 12 has better transfer onto the substrate due to lower viscosity and better flow. As a result, the print has more uniform ink lay, higher density and gloss than does the ink containing the conventional pigment.

EXAMPLE 2

An energy curable, cationic, green ink formulation was formulated using the modified Pigment Yellow 12 of Example 1 and conventional Pigment Blue 15:3.

The energy curable, cationic ink was formulated from the following components.

| COMPONENTS | WEIGHT % |
|---|---|
| Cyracure ® 6110[a] | 64.5 |
| Modified Pigment Yellow 12 of Example 1 | 6 |
| Pigment Blue 15.3 | 10 |
| CD 1012[b] | 3 |
| Heloxy[g] 116[c] | 15 |
| PE wax[d] | 1 |
| DC -57[e] | .5 |

The Cyracure® 6110, the modified Pigment Yellow 12, and the conventional Pigment Blue 15.3 were first mixed at high speed (about 1000 rpm) with a Cowles blade and then processed through a media mill containing 1 mm size media. After processing the remaining components were added and the viscosity of the two green inks were measured.

| PIGMENT | VISCOSITY @ 25° C. |
|---|---|
| Modified Green Ink | 550 ± 50 cps at 240 s$^{-1}$ |
| Conventional Green Ink | 750 ± 50 cps at 240 s$^{-1}$ |

EXAMPLE 3

An energy curable, free radical, addition polymerizable ink formulation was formulated using a modified Pigment Red 22 containing Pigment Red 22 and rheological additive.

Modified Pigment Red 22 composition containing Pigment Red 22 and rheological additive was prepared as described in Example 5 of U.S. Pat. No. 5,024,698. 20.2 parts of 5-nitro-o-toluidine were dissolved in 280 parts water and 42.7 parts hydrochloric acid (31%) at 65° C. The volume was adjusted to 600 parts at 3 to 5° C. using ice/water, and 24.6 parts of aqueous sodium nitrite solution were added. The solution was stirred for 60 minutes at 5 to 7° C. 20.8 parts of 70% acetic acid were then added to the resultant diazo solution and the final volume was adjusted to 700 parts with the addition of ice/water.

34.7 parts of 2-naphthalenecarboxamide, 3-hydroxy-N-phenyl (Naphthol AS) were dissolved in 600 parts water and 30 parts of 50% sodium hydroxide solution at 75° C. 2.0 parts of sulfated castor oil were added and the volume was adjusted to 1300 parts at 30° C.

The diazo solution was then added to the Naphthol AS solution over 25 minutes, together with 10.8 parts of azomethine coupler B of U.S. Pat. No. 5,024,698. The mixture was stirred for 30 minutes to complete coupling and the resultant pigment slurry was heated to 90° C., filtered, washed, and dried at 70° C. (Yield 65.7 parts of the modified Pigment Red 22 composition)

The energy curable, cationic ink was formulated from the following components.

| COMPONENTS | WEIGHT % |
|---|---|
| Ebecryl ® 3701[i] | 30 |
| Trimethylolpropane triacrylate (TMPTA) | 26.5 |
| Modified Pigment Red 22 | 15 |
| Tripropylene glycol diacrylate (TRPGDA) | 12 |
| N-vinyl pyrrolidone (N-VP) | 10 |
| Isopropyl thioxanthone (ITX) | 3 |
| Ethyl 4-(dimethylamino) benzoate (EDB) | 3 |
| Irgacure ® 369[j] | 2 |
| PE wax[d] | 1 |
| FC-430[k] | 0.5 |

[i]Ebecryl ® 3701, available from the Radcure Corporation, Smyrna, GA, is acrylated epoxy resin;
[j]Irgacure ® 369, available from the Ciba Corporation, White Plains, NY, is, alphaamino acetophenone; and
[k]FC-430, available from the 3M Company, St Paul, MN, is a fluorocarbon surfactant.

The Ebecryl® 3701, TMPTA and the Modified Pigment Red 22 were mixed at high speed (about 1000 rpm) with a Cowles blade and then ground on a 3 roll mill. After grinding the remaining components were added and the 5 viscosity of the two inks were measured.

| PIGMENT | VISCOSITY @ 25° C. |
|---|---|
| Modified PR-22 | 500 ± 50 cps at 240 s$^{-1}$ |
| Conventional PR-22 | 800 ± 50 cps at 240 s$^{-1}$ |

Printing runs as described in Example 1 were carried out with the modified and conventional Pigment Red 22 ink compositions except that a Cyrel® flexographic printing plate (available from E. I. Du Pont de Nemours & Company, Wilmington, Del.) was used. Color density and gloss measurements were carried out with the modified and conventional Pigment Red 22 prints. The assessed quality using the two ink formulations were:

| PIGMENT | COLOR DENSITY | GLOSS 60° |
|---|---|---|
| Modified PR-22 | 1.73 | 85 |
| Conventional PR-22 | 1.52 | 60 |

The ink containing the modified Pigment produced higher density and gloss than the ink containing the conventional pigment.

EXAMPLE 4

An energy curable, free radical addition polymerizable ink formulation was formulated using a modified Pigment Orange 16 containing Pigment Orange 16 and rheological additive.

Modified Pigment Orange 16 composition containing Pigment Orange 16 and rheological additive was prepared as described in Example 8 of U.S. Pat. No. 4,946,509, but with Jeffamine® M2005 in place of Jeffamine M2070 (Jeffamine is a Registered Trademark of Shell Company, Houston, Tex.). Tetrazotized o-dianisidine was prepared by charging 20.9 parts of o-dianisidine to 39.8 parts of 200 Be HCl and 140 parts of an ice/water mixture with constant stirring to form a homogeneous suspension. Then 32.6 parts of 38% sodium nitrite was added and stirring continued for 1 hour at 0 to 5° C. The excess nitrous acid was destroyed by adding approximately 0.5 parts sulfamic acid.

A fine suspension of acetoacetanilide (AAA) was prepared by adding 31.7 parts AAA to 400 parts H20 and 33.6 parts of 50% aqueous NAOH. The mixture was stirred until all of the AAA was dissolved. The temperature of the solution was adjusted to 0 to 5° C. by adding ice and subsequently the AAA was precipitated by slowly adding 38.5 parts of 70% acetic acid.

An azomethine coupling component was formed by adding 1.2 parts of AAA to 13.5 parts of Jeffamine M-2005 and heating the mixture between 100 and 1050C while stirring. After 1 hour, the reaction was complete as evidenced by the disappearance of the ketone absorption band in the IR spectrum at approximately 1673 cm$^1$. The resulting azomethine was added to the suspension of AAA immediately prior to coupling with the tetrazotized DCB. Coupling was then carried out by adding the tetrazotized DCB to the AAA suspension over a 1 hour period. Stirring was continued until no excess tetrazo remained. Then the slurry was heated between 90 and 95° C., stirred for 15 minutes, filtered, washed and dried at 60° C. (Yield 62.2 parts of the modified Pigment Orange 16 composition).

The energy curable, free radical addition polymerizable ink was formulated from the following components.

| COMPONENT | WEIGHT % |
|---|---|
| Genomer ® D 585[m] | 40 |
| Glycerolpropoxy triacrylate (GPTA) | 10 |
| Modified Pigment Orange 16 | 15 |
| Dipropylene glycol diacrylate (DPGDA) | 26.5 |
| ITX | 3 |
| EDB | 3 |
| Irgacure ® 369[j] | 1 |
| PE wax[k] | 1 |
| FC-430[k] | .5 |

[m]Genomer ® D 585, available from Rahn Corporation, Switzerland, is an epoxy acrylate The Genomer® D 585, GPTA and the modified Pigment Orange 16 were mixed at high speed (about 1000 rpm) with a Cowles blade then ground on a 3 roll mill. After grinding, the remaining components were added and the viscosity of the two inks were measured.

| PIGMENT | VISCOSITY @ 25° C. |
|---|---|
| Modified PO-16 | 900 ± 100 cps at 240 s$^{-1}$ |
| Conventional PO-16 | 1,500 ± 100 cps at 240 s$^{-1}$ |

Printing runs as described in Example 1 were carried out with the modified and conventional Pigment Orange 16 ink compositions. Color density and gloss measurements were carried out with the modified and conventional Pigment Orange 16 prints. The assessed quality using the two ink formulations were:

| PIGMENT | COLOR DENSITY | GLOSS 60° |
| --- | --- | --- |
| Modified PO-16 | 2.00 | 91 |
| Conventional PO-16 | 1.65 | 79 |

The ink containing the Modified Pigment produced a more transparent image with a cleaner shade and higher density and gloss, than did the ink containing the conventional pigment.

EXAMPLE 5

An electron beam curable, free radical addition polymerizable ink formulation was formulated using the Modified Pigment Red 22 composition of Example 3.

The electron beam curable, cationic ink was formulated from the following components.

| COMPONENTS | WEIGHT % |
| --- | --- |
| Ebecryl® 3701[i] | 38 |
| Trimethylolpropane triacrylate (TMPTA) | 26.5 |
| Modified Pigment Red 22 of Example 5 | 15 |
| Tripropylene glycol diacrylate (TRPGDA) | 12 |
| N-vinyl pyrrolidone (N-VP) | 10 |
| PE wax[d] | 1 |
| FC-430[k] | .5 |

The Ebecryl® 3701, TMPTA and the modified Pigment Red 22 were mixed at high speed (about 1000 rpm) with a Cowles blade then ground on a 3 roll mill. After grinding, the remaining components were added and the 30 viscosity of the two inks were measured.

| PIGMENT | VISCOSITY @ 25° C. |
| --- | --- |
| Modified PR-22 | 800 ± 50 cps at 240 s$^{-1}$ |
| Conventional PR-22 | 1,200 ± 100 cps at 240 s$^{-1}$ |

The modified Pigment Red 22 ink formulation was used to print an image on of white polyethylene film with a gloss of using a Chestnut® flexographic printing press (Chestnut is a Registered Trademark of Chestnut W. R. Engineering Corporation, Fairfield, N.J.) with a Cyrel® Flexographic printing plate (Cyrel is a Registered Trademark of E. I. Du Pont de Nemours & Company, Wilmington, Del.). The printing speed was 200 feet/min. The printing press was equipped with an electron beam unit from ESI which had an irradiation output of 3 mega rads at 165 kV. The quality of the cured printed image was comparable to the UV cured image of Example 3 using white polyethylene film.

EXAMPLE 6

The energy curable, free radical addition polymerizable ink formulation of Example 4 was used to print an image on white polyethylene film with a gloss of 40 using a Chestnut flexographic printing press with a Cyrel® flexographic printing plate. The printing speed was 200 feet/min. The printing press was equipped with two curing stations through which the printed web passed. The first curing station through which the web passed as it left the printing station was a UV light unit from Prime Systems Inc. having a lamp with an output of 400 Watts/inch in the UV spectral region and a cylindrical reflector. The second curing station which was located after the first station along the path of the printed web, was a electron beam unit from which provided a beam of electrons having an irradiation output of 3 mega rads at 165 kV, which impinged on the printed surface of the web. The quality of the cured printed image was comparable to the UV cured image of Example 4 using white polyethylene film.

In practice the first curing step to UV radiation cures at least the surface of the printed ink image, and the second electron beam curing step cures the printed ink image in depth to complete the cure. By use of this hybrid curing step higher printing speeds are achieved with UV opaque ink systems. Also, better film properties, adhesion and less unreacted components are present that could migrate from the cured ink film.

EXAMPLE 7

The energy curable, cationic ink formulation of Example 2 was printed on a SBS coated board having a gloss of 16 (available from James River Corporation, Wausau, Wis.).

Printing runs were carried out as described in Example 2. Using the Modified Pigment Blue 15:4 ink composition, a uniform ink film was applied to the substrate and cured. A cured uniform ink film was likewise prepared using conventional Pigment Blue 15:4 ink composition.

Color density and gloss measurements were carried out with the modified and conventional Pigment Blue 15:4 prints. The assessed quality using the two ink formulations were:

| PIGMENT | COLOR DENSITY | GLOSS 60° |
| --- | --- | --- |
| Modified PB-15:4 | 1.25 | 64 |
| Conventional PB-15:4 | 1.03 | 52 |

The ink containing the modified Pigment produced a ore uniform image with higher density and gloss on the coated board, than the ink containing the conventional pigment.

EXAMPLE 8

An energy curable, cationic ink formulation was formulated using a modified Pigment Black 7 composition containing Pigment Black 7 and rheological additive prepared by charging a presscake, containing 210 parts by weight of copper phthalocyanine sulfonyl chloride (which may be prepared by any conventional method) into a mixture of 692 parts by weight of a primary amine-terminated poly (ethylene oxide/propylene oxide) (5/95) copolymer having a number average molecular weight of approximately 2,000 (available as XTJ 507 from the Huntsman Corporation) and 66 parts by weight of sodium carbonate and mixed. The final reaction mixture was then heated to 80–90° C. under vacuum to remove water and produce the copper phthalocyanine additive. Then this was added to 81% by weight of conventional Pigment Black 7. The ink was formulated by adding the following components:

| COMPONENTS | WEIGHT % |
|---|---|
| Cyracure ® 6110[(a)] | 65 |
| Modified Pigment Black 7 | 18 |
| CD 1012[(b)] | 5 |
| Irgacure ® 261[(f)] | .5 |
| DVE 3[(g)] | 5 |
| PE wax[(d)] | 1 |
| DC 57[(e)] | .5 |

The Cyracure® 6110 and the modified Pigment Black 7 were mixed at high speed (about 2000 rpm) with a Cowles blade then processed through a media mill containing 1 mm size media. After processing, the remaining components were added and the viscosity of the two inks were measured.

| PIGMENT | VISCOSITY @ 25° C. |
|---|---|
| Modified PR-7 | 350 ± 50 cps at 240 s$^{-1}$ |
| Conventional PR-7 | 700 ± 50 cps at 240 s$^{-1}$ |

Color density and gloss measurements were carried out with the modified and conventional Pigment Black 7 ink using the methods of Example 1. The assessed quality using the two ink formulations were:

| PIGMENT | COLOR DENSITY | GLOSS 60° |
|---|---|---|
| Modified PB-7 | 2.02 | 78 |
| Conventional PB-7 | 1.82 | 66 |

The ink containing the modified Pigment has a much higher density, gloss and better color jetness due to presence of the copper phthalocyanine derived rheological additive than the ink containing a conventional pigment.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. An energy curable flexographic ink consisting essentially of a pigment; a rheological additive having the structure:

P-(U-Y)$_s$ wherein P is the residue of an organic colorant, Y is a polyalkylene oxide moiety, U is a linking moiety covalently bonding Y to P, and s is an integer from 1 to 3 and; an energy curable liquid vehicle; wherein the ink is substantially free of fugitive solvent and has a viscosity ranging from about 50 cps to about 3000 cps.

2. The ink of claim 1 wherein the polyalkylene oxide moiety is an ethylene oxide polymer.

3. The ink of claim 1 wherein the polyalkylene oxide moiety is an ethylene oxide/propylene oxide copolymer.

4. The ink of claim 3 wherein the copolymer has the general formula:

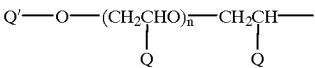

wherein n is about 4 to about 400; Q is H, CH$_3$, or a combination thereof; and Q' is a C$_1$–C$_6$ alkyl moiety.

5. The ink of claim 4 wherein n is about 4 to 35 about 60.

6. The ink of claim 1 wherein P is a residue of an azo pigment, phthalocyanine pigment, dioxazine pigment, quinacridone pigment, perylene pigment, or perinone pigment.

7. The ink of claim 1 wherein U is a covalent bond, or a multivalent moiety selected from the group consisting of C$_1$–C$_6$ alkyl, —NHSO$_2$—, —O—, —CO—, —COO—, —N=, and —CONH—.

8. The ink of claim 1 where s has the value 1 or 2.

9. The ink of claim 1 wherein the rheological additive is an azomethine having the general formula:

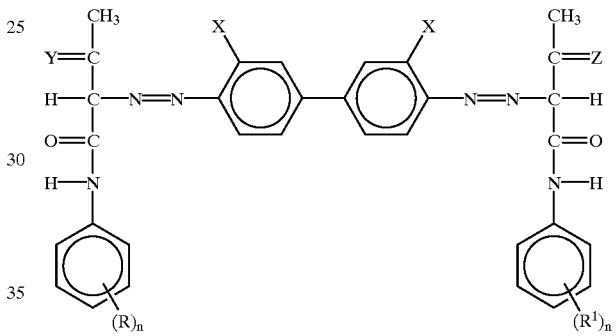

wherein Y is the alkylene oxide polymer containing about to about 200 groups; R and R$^1$ are independently selected from the group consisting of H, CH$_3$, OCH$_3$, OCH$_2$CH$_3$, and Cl; n is an integer from 1 to 5; X is selected from the group consisting of C$_1$, CH$_3$, and OCH$_3$; and Z is selected from the group consisting of 0 and N—Y.

10. The ink of claim 1 wherein the additive is an azomethine having the general formula:

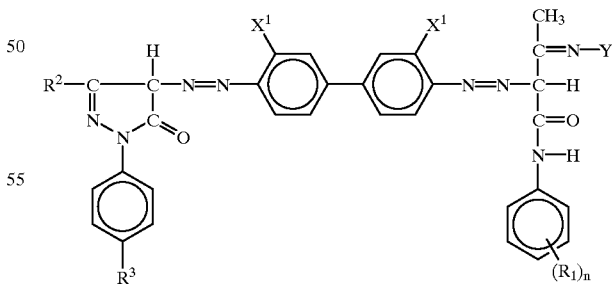

wherein Y is the polyalkylene oxide polymer containing about 4 to about 20 repeat units; R$^1$ is H, CH$_3$, OCH$_3$ OCH$_2$CH$_3$ or Cl; n is an integer from 1 to 5; R$_2$ is C$_3$ or COOCH$_2$CH$_3$; R$^3$ is H or CH$_3$; and Xl is Cl or OCH$_3$.

11. The ink of claim 1 wherein the additive is a diarylide having the general formula:

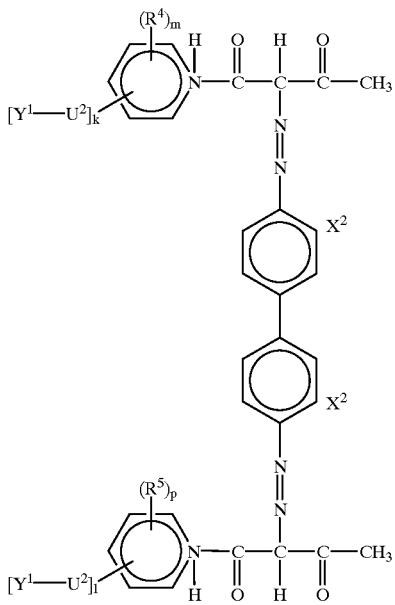

wherein: $R^4$ and $R^5$ are independently selected from the group consisting of $C_1$–$C_4$-alkyl, $C_1$–C4 alkoxy, and halogen; m and p are independently integers of 0 to 5; $X^2$ is selected from the group consisting of $C_1$, $CH_3$, and $OCH_3$; $U^2$ comprises a divalent bridging moiety selected from the group consisting of $C_1$–C6 alkyl, —$NHSO_2$—, —O—, —CO—, —COO—, and —CONH—; $Y^1$ comprises the polyalkylene oxide moiety having a number average molecular weight of about 200 to 10,000; and k and 1 are independently integers of 0 or 1, with the proviso that for at least 50 wt. % of the pigment composition, k and 1 are both equal to 0, and for at least 3 wt. % of the pigment composition 5 k and/or 1 are equal to 1.

12. The ink of claim 1 wherein the additive is an azomethine having the general formula:

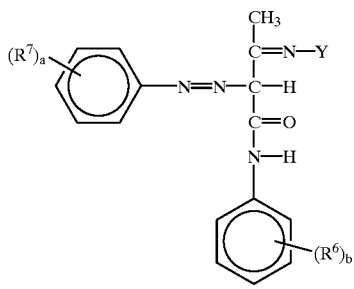

wherein Y is the polyalkylene oxide polymer containing about 4 to about 20 repeat units; R6 is independently selected from the group consisting of Cl, $OCH_3$, $CH_3$, $OC_2H_5$, $C_2H_5$, and $CONH_2$; $R^7$ is independently selected from the group consisting of Cl, $OCH_3$, $CH_3$, $NO_2$, $OC_2H_5$, $C_2H_5$, $CONH_2$, $SO_3H$, OH and COOH; and a and b are independently integers of 0 to 5.

13. The ink of claim 1 wherein the additive is a phthalocyanine having the general formula:

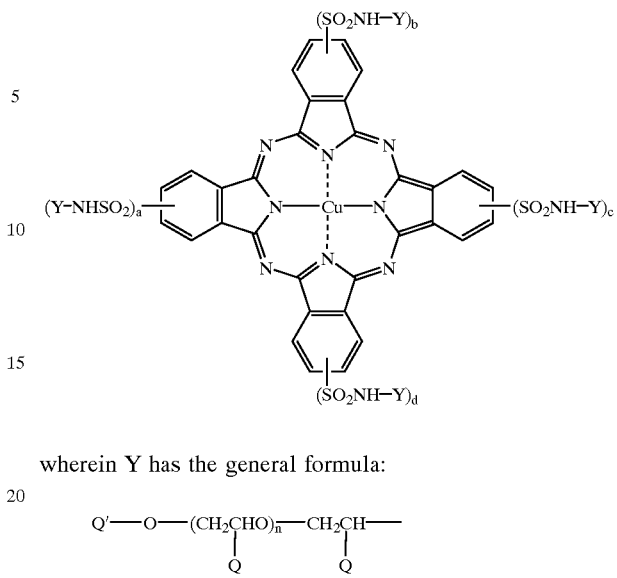

wherein Y has the general formula:

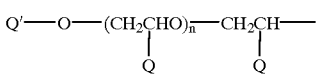

to wherein n is about 4 to about 400, and a, b, c and d are integers independently from about 0 to about 4, provided at least one of them is 1; Q is H, $CH_3$ or a combination thereof; and Q' is a $C_1$–$C_6$ alkyl moiety.

14. The ink of claim 1 wherein the pigment is selected from the group consisting of Pigment Yellow 1, Pigment Yellow 3, Pigment Yellow 12, Pigment Yellow 13, Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23, and Pigment Black 7.

15. The ink of claim 1 wherein the pigment is distinct from P.

16. The ink of claim 1 wherein the pigment is the same as P.

17. The ink of claim 16 wherein the ink contains an additional distinct pigment.

18. The ink of claim 1 wherein the energy curable liquid vehicle is a ring opening polymerizable composition.

19. The ink of claim 18 wherein the polymerizable composition is a cationic polymerizable system comprising one or more mono-functional and/or multi-functional expoxide monomers.

20. The ink of claim 18 further comprising a polymerization initiating system activatable by actinic radiation.

21. The ink of claim 1 wherein the energy curable liquid vehicle is a free radical addition polymerizable system comprising an ethyleneically unsaturated monofunctional or multi-functional monomer.

22. The ink of claim 21 wherein the ink contains a free radical generating, addition polymerization initiating system activatable by actinic radiation.

23. The ink of claim 1 wherein the ink contains a surface active agent, a wax, or a combination thereof.

24. A method of flexographic printing and curing a flexographic ink image comprising the steps of:
(a) preparing an energy curable flexographic ink consisting essentially of a pigment and a rheological additive of the structure:

$$P\text{-}(U\text{-}Y)_s$$

wherein P is the residue of an organic colorant, Y is a polyalkylene oxide moiety, U is a linking moiety covalently bonding Y to P, and s is an integer from 1 to 3; and an energy curable liquid vehicle; wherein the ink is substantially free of fugitive solvent and has a viscosity ranging from about 50 cps to about 3,000 cps;

(b) printing the ink on a substrate surface to form an image; and (c) subjecting the image to actinic radiation or thermal energy to form a cured image.

25. The method of claim 24 wherein the actinic radiation is a beam of electrons.

26. The method of claim 24 wherein the energy curable ink contains a polymerization initiating system activatable by actinic radiation, and wherein the actinic radiation is ultraviolet radiation.

27. The method of claim 24 wherein the image is subjected to ultraviolet radiation or a beam of electrons.

* * * * *